US011764676B2

(12) United States Patent
Lai et al.

(10) Patent No.: US 11,764,676 B2
(45) Date of Patent: Sep. 19, 2023

(54) POWER SUPPLY CIRCUIT

(71) Applicant: Realtek Semiconductor Corporation, Hsinchu (TW)

(72) Inventors: Chao-Min Lai, Hsinchu (TW); Chien-Liang Chen, Hsinchu (TW); Hung-Wei Wang, Hsinchu (TW); Shih-An Yang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 133 days.

(21) Appl. No.: 17/358,115

(22) Filed: Jun. 25, 2021

(65) Prior Publication Data
US 2022/0166316 A1 May 26, 2022

(30) Foreign Application Priority Data
Nov. 24, 2020 (TW) .................................. 109141182

(51) Int. Cl.
*H02M 3/158* (2006.01)
*H02M 1/00* (2006.01)

(52) U.S. Cl.
CPC ......... *H02M 3/158* (2013.01); *H02M 1/0067* (2021.05)

(58) Field of Classification Search
CPC ............................ H02M 3/158; H02M 1/0067

USPC .......................................................... 323/282
See application file for complete search history.

(56) References Cited

U.S. PATENT DOCUMENTS

| | | | |
|---|---|---|---|
| 2013/0121048 A1* | 5/2013 | Gasperi ................. | H02M 3/156 363/89 |
| 2014/0192571 A1* | 7/2014 | Gasperi .................. | G05F 1/468 361/18 |
| 2019/0187772 A1 | 6/2019 | Boudoux | |
| 2019/0190386 A1* | 6/2019 | Cheng ..................... | G05F 1/565 |

FOREIGN PATENT DOCUMENTS

| | | |
|---|---|---|
| WO | 9838727 A2 | 9/1998 |
| WO | 02099948 A1 | 12/2002 |

* cited by examiner

*Primary Examiner* — Yemane Mehari
(74) *Attorney, Agent, or Firm* — Locke Lord LLP; Tim Tingkang Xia, Esq.

(57) ABSTRACT

A power supply circuit includes a first regulator and a second regulator. The first regulator is configured to generate a first output signal according to an input signal. A voltage value of the first output signal decreases according to the input signal and a first voltage threshold value at a power-off stage. The second regulator is configured to be enabled according to the first output signal to generate a second output signal according to the input signal. A voltage value of the second output signal decreases according to the input signal and a second voltage threshold value at the power-off stage. The second voltage threshold value is greater than the first voltage threshold value.

14 Claims, 5 Drawing Sheets

POWER SUPPLY CIRCUIT

RELATED APPLICATIONS

This application claims priority to Taiwanese Application Serial Number 109141182, filed Nov. 24, 2020, which is herein incorporated by reference.

BACKGROUND

Technical Field

The present disclosure relates to power technology. More particularly, the present disclosure relates to a power supply circuit using regulators to control timing sequence.

Description of Related Art

With developments of technology, power supply technology has been applied in various electrical devices. In some related arts, resistors and capacitors are used to control the timing sequence of supplying power. However, the resistors and the capacitors are sensitive to the changes of environment (e.g., the changes of temperature). In addition, as the process evolves, it requires developing a new control method to apply effective control to the timing sequence of power supply.

SUMMARY

Some aspects of the present disclosure are to provide a power supply circuit. The power supply circuit includes a first regulator and a second regulator. The first regulator is configured to generate a first output signal according to an input signal. A voltage value of the first output signal decreases according to the input signal and a first voltage threshold value at a power-off stage. The second regulator is configured to be enabled according to the first output signal to generate a second output signal according to the input signal. A voltage value of the second output signal decreases according to the input signal and a second voltage threshold value at the power-off stage. The second voltage threshold value is greater than the first voltage threshold value.

Based on the descriptions above, the present disclosure uses regulators to control the timing sequence of supplying power. This method can prevent the timing sequence of power supply changing due to the changes of environment. In addition, the present disclosure can effectively control that the voltage rising timing point of the relatively low output signal is earlier than the voltage rising timing point of the relatively high output signal, and effectively control that the voltage falling timing point of the relatively high output signal is earlier than the voltage falling timing point of the relatively low output signal. This voltage supply mode can be applied to advanced processes.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

In the present disclosure, "connected" or "coupled" may refer to "electrically connected" or "electrically coupled." "Connected" or "coupled" may also refer to operations or actions between two or more elements.

The following embodiments are disclosed with accompanying diagrams. It is understood that these details do not intend to limit the present disclosure. That is, these details are not necessary in some embodiments of the present embodiments. In addition, some widely used structures and components will be shown in a simple schematic way in the diagram.

Figure 1:
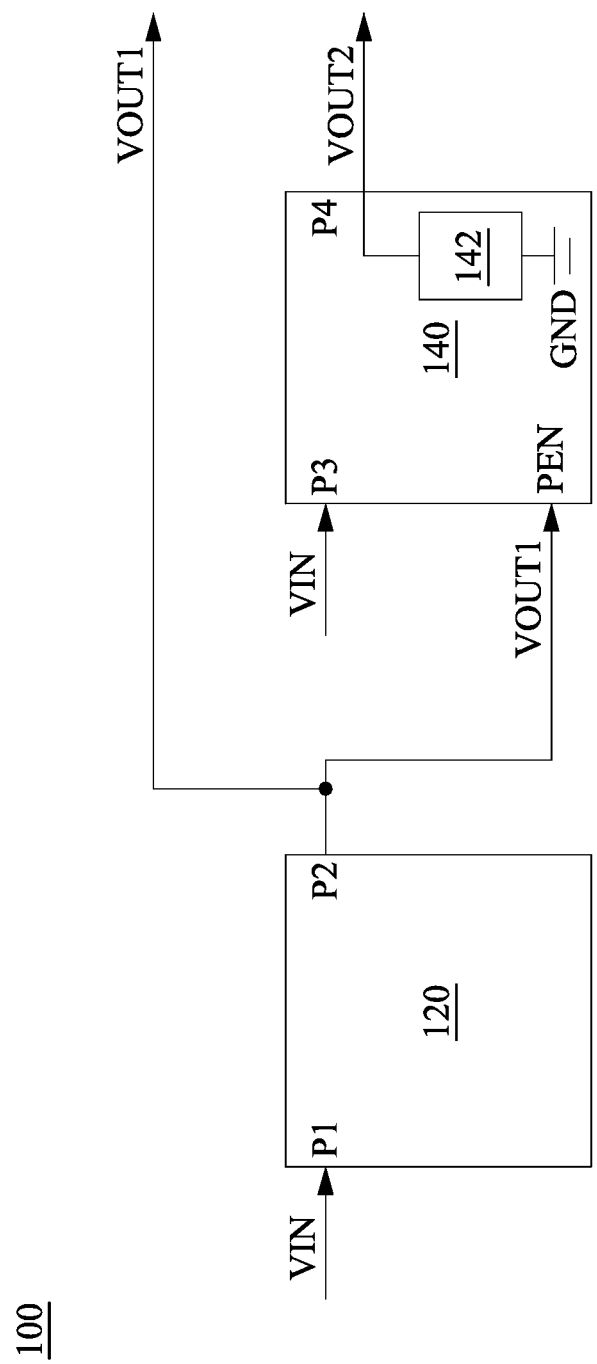
FIG. 1 is a schematic diagram of a power supply circuit according to some embodiments of the present disclosure.

Reference is made to FIG. 1. FIG. 1 is a schematic diagram of a power supply circuit 100 according to some embodiments of the present disclosure. In some embodiments, the power supply circuit 100 is disposed in a cell phone, a notebook, or various electrical devices.

The power supply circuit 100 is configured to provide an output signal VOUT1 and an output signal VOUT2 according to an input signal VIN so as to supply power to other circuits in the aforementioned electrical devices. In some embodiments, a transformer can transform an original supply voltage to generate the input signal VIN. A maximum voltage value of the original supply voltage can be, for example, 12 volts, and a maximum voltage value of the input signal VIN can be, for example, 5 volts. In some embodiments, a maximum voltage value of the output signal VOUT1 is less than a maximum voltage value of the output signal VOUT2. For example, the maximum voltage value of the output signal VOUT1 can be 1.8 volts, and the maximum voltage value of the output signal VOUT2 can be 3.3 volts.

However, the present disclosure is not limited to the aforementioned maximum voltage values. Various suitable maximum voltage values are within the contemplated scopes of the present disclosure.

As illustrated in FIG. 1, the power supply circuit 100 includes a regulator 120 and a regulator 140.

The regulator 120 includes an input terminal P1 and an output terminal P2. The input terminal P1 is configured, to receive the input signal VIN. The regulator 120 is configured to generate the output signal VOUT1 at the output terminal P2 according to the input signal VIN.

The regulator 140 includes an enable terminal PEN, an input terminal P3, an output terminal P4, a discharging circuit 142, and other internal circuits (not shown). The regulator 140 is configured to receive the output signal VOUT1 through the enable terminal PEN, and the output signal VOUT1 is from the output terminal P2 of the regulator 120. The output signal VOUT1 can be configured to enable the regulator 140. The input terminal P3 is configured to receive the input signal VIN. When the regulator 140 is enabled by the output signal VOUT1, the other internal circuits in the regulator 140 can generate the output signal VOUT2 at the output terminal P4 according to the input signal VIN. The discharging circuit 142 is coupled between the output terminal P4 and a ground terminal GND.

Figure 2:
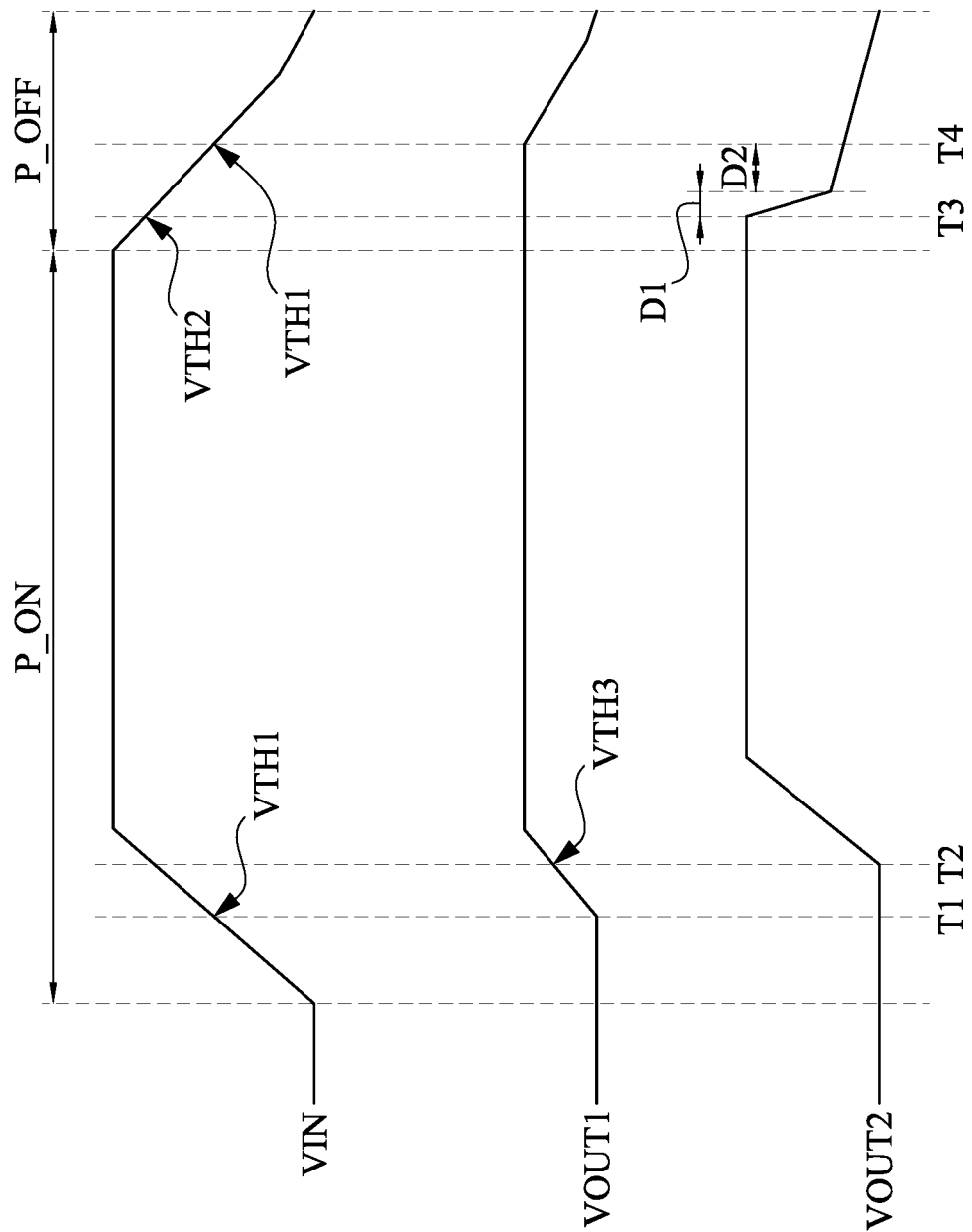
FIG. 2 is a timing sequence diagram of signals of the power supply circuit in FIG. 1 according to some embodiments of the present disclosure.

Reference is made to FIG. 2. FIG. 2 is a timing sequence diagram of signals of the power supply circuit 100 in FIG. 1 according to some embodiments of the present disclosure.

The timing sequence diagram in FIG. 2 includes two continuous time intervals. The two time intervals are, from the left side to the right side (i.e., the direction of time lapse), a power-on stage P_ON and a power-off stage P_OFF. A timing point T1 and a timing point T2 are in the time interval of the power-on stage P_ON, in which the timing point T1 is earlier than the timing point T2. A timing point T3 and a timing point T4 are in the time interval of the power-off stage P_OFF, in which the timing point T3 is earlier than the timing point T4.

Figure 3:
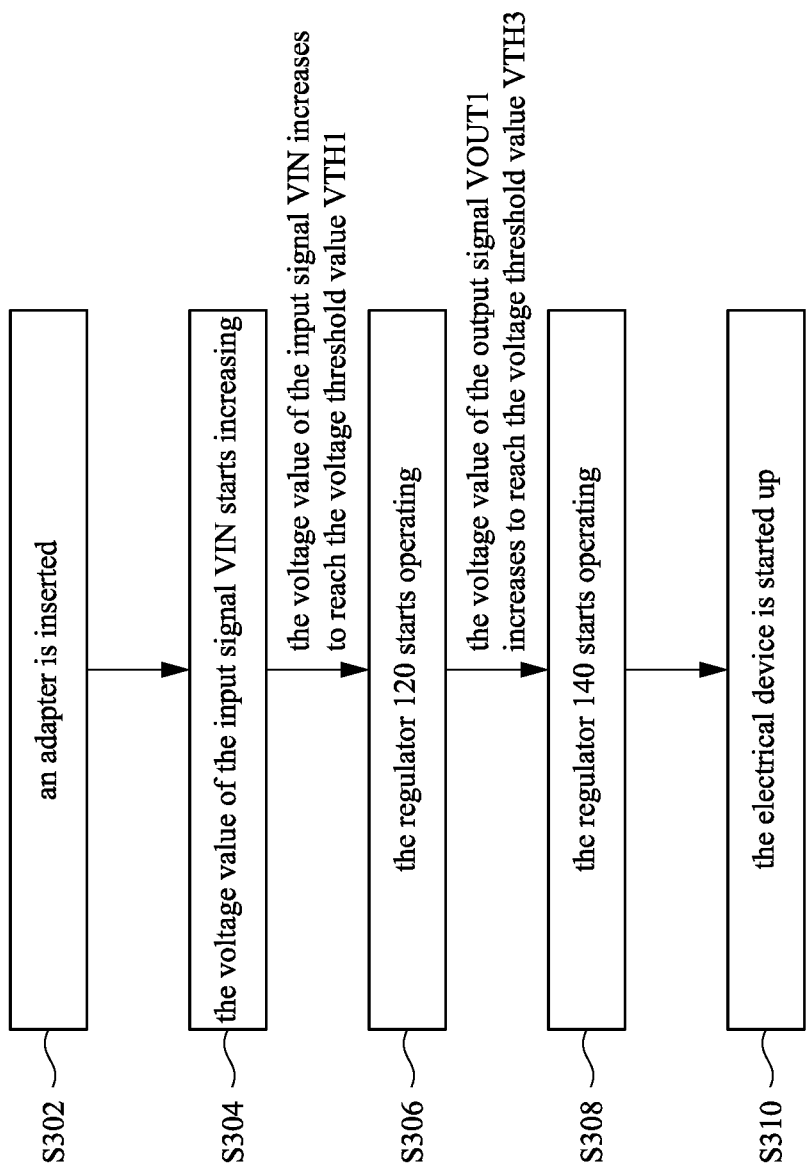
FIG. 3 is flow diagram of a power on procedure of a power supply circuit according to some embodiments of the present disclosure.

FIG. 3 is flow diagram of a power on procedure of the power supply circuit 100 according to some embodiments of the present disclosure. FIG. 3 is described in following paragraphs with reference to FIG. 1 and FIG. 2.

In operation S302, an adapter is inserted in an electrical device. For example, a terminal of the adapter is coupled to the input terminal P1 of the power supply circuit 100 in the electrical device, and the other terminal of the adapter is configured to receive mains electricity. The adapter can supply power to the power supply circuit 100 according to the mains electricity.

In operation S304, the voltage value of the input signal VIN starts increasing. As illustrated in FIG. 2, when the adapter is inserted in the electrical device, the voltage value of the input signal VIN starts increasing. This represents that it enters the power-on stage P_ON. When the voltage value of the input signal VIN reaches its maximum voltage value (e.g., 5 volts), the input signal VIN enters a steady state (as the state shown by the horizontal line in FIG. 2).

In operation S306, the regulator 120 starts operating. As illustrated in FIG. 2, at the timing point T1, the voltage value of the input signal VIN reaches a voltage threshold value VTH1 (e.g., 2.5 volts, but the present disclosure is not limited thereto) corresponding to the regulator 120. At this time, the output signal VOUT1 of the regulator 120 is charged according to the input signal VIN. In other words, when the voltage value of the input signal VIN is equal to or greater than the voltage threshold value VTH1 at the power-on stage P_ON, the regulator 120 is enabled such that the voltage value of the output signal VOUT1 increases. When the voltage value of the output signal VOUT1 reaches the maximum voltage value (e.g., 1.8 volts) of the regulator 120, the output signal VOUT1 enters a steady state.

In operation S308, the regulator 140 starts operating. As illustrated in FIG. 2, at the timing point T2, the voltage value of the output signal VOUT1 inputted into the enable terminal PEN of the regulator 140 reaches to a voltage threshold value VTH3 (e.g., 1.08 volts, but the present disclosure is not limited thereto) corresponding to the regulator 140. At this time, the regulator 140 is enabled and the output signal VOUT2 is charged according to the input signal VIN. In other words, when the voltage value of the output signal VOUT1 is equal to or greater than the voltage threshold value VTH3 at the power-on stage P_ON, the regulator 140 is enabled such that the voltage value of the output signal VOUT2 increases. When the voltage value of the output signal VOUT2 reaches the maximum voltage value (e.g., 3.3 volts) of the regulator 140, the output signal VOUT2 enters a steady state. In this embodiment, the voltage threshold value VTH3 is less than the voltage threshold value VTH1.

In operation S310, the electrical device is started up. The output signals VOUT1 and VOUT2 are in the steady state and can be configured to supply power to other circuits in the electrical device such that the electrical device is started up and operates normally.

In electrical devices of some related arts, the starting operating timing point of circuits powered by a relatively high voltage is earlier than the starting operating timing point of circuits powered by a relatively low voltage.

As described above, in some embodiments of the present disclosure, the maximum voltage value (e.g., 1.8 volts) of the output signal VOUT1 is less than the maximum voltage value (e.g., 3.3 volts) the output signal VOUT2. Accordingly, compared to the related arts above, in these embodiments, elements (the regulator 120) that are configured to supply a relatively low voltage start to work first in order to supply the relatively low output signal VOUT1 to corresponding circuits and further enable elements (the regulator 140) that are configured to supply a relatively high voltage, such that the circuits powered by the relatively high voltage start to work later than those powered by the relatively low voltage. This voltage supply mode can be applied to advanced processes (e.g., 12 nm process or other advanced processes).

Figure 4:
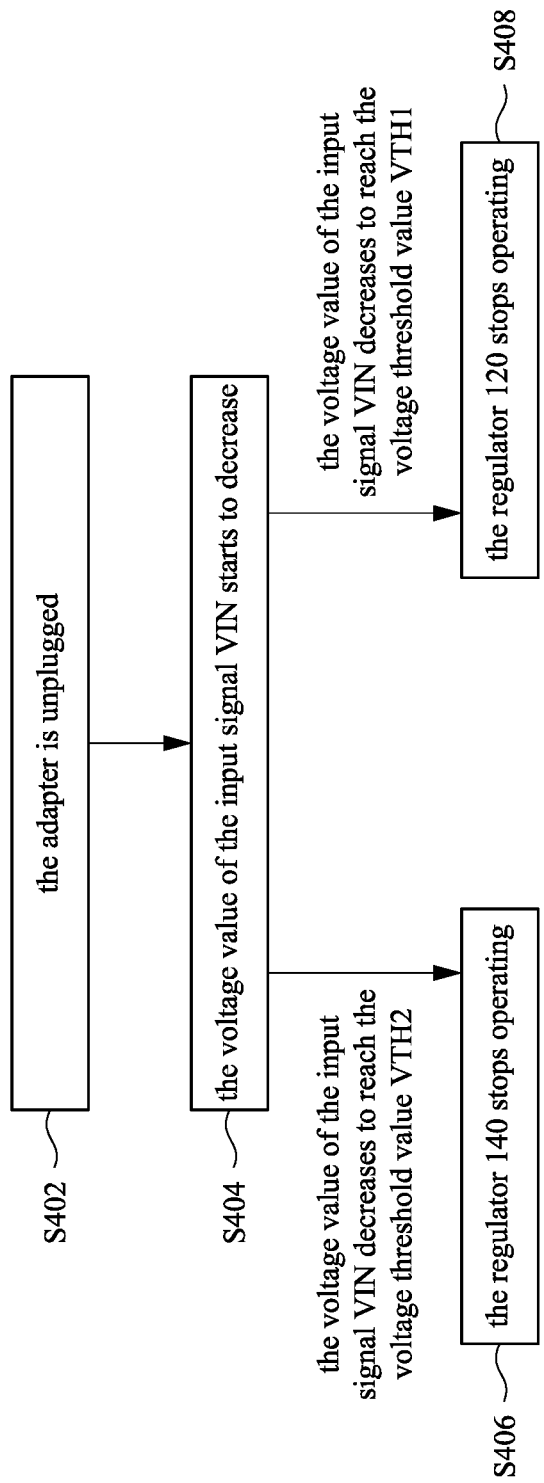
FIG. 4 is flow diagram of a power off procedure of a power supply circuit according to some embodiments of the present disclosure.

FIG. 4 is flow diagram of a power off procedure of the power supply circuit 100 according to some embodiments of the present disclosure. FIG. 4 is described in following paragraphs with reference to FIG. 1 and FIG. 2.

In operation S402, the adapter is unplugged from the electrical device.

In operation S404, the voltage value of the input signal VIN starts to decrease. As illustrated in FIG. 2, when the adapter is unplugged from the electrical device, the voltage value of the input signal VIN starts to drop. This shows that it enters the power-off stage P_OFF.

In operation S406, the regulator 140 stops operating. As illustrated in FIG. 2, at the timing point T3, the voltage value of the input signal VIN decreases to reach a voltage threshold value VTH2 (e.g., 4.2 volts, but the present disclosure is not limited thereto) corresponding to the regulator 140. In some embodiments, the voltage threshold value VTH2 is an Under Voltage Lockout voltage of the regulator 140. At this time, the discharging circuit 142 of the regulator 140 is turned on such that the output signal VOUT2 is discharged rapidly. In other words, when the voltage value of the input signal VIN is equal to or less than the voltage threshold value VTH2 at the power-off stage P_OFF, the discharging circuit 142 of the regulator 140 is controlled such that the voltage value of the output signal VOUT2 decreases rapidly.

As illustrated in FIG. 2, the power-off stage P_OFF includes a time interval D1 and a time interval D2, in which the time interval D2 is later than the time interval D1 in time sequence. In the time interval D1, since the discharging circuit 142 is turned on, the output signal VOUT2 is discharged rapidly. When it enters the time interval D2 (e.g., the output signal VOUT2 is equal to 1.2 volts, but the present disclosure is not limited thereto), the regulator 140 is underpowered, so the discharging rate of the output signal VOUT2 becomes lower (the discharging rate of the output signal VOUT2 in the time interval D1 is higher than the discharging rate of the output signal VOUT2 in the time interval D2).

In operation S408, the regulator 120 stops operating. As illustrated in FIG. 2, at the timing point T4, the voltage value of the input signal VIN deceases to reach the voltage threshold value VTH1 (e.g., 2.5 volts, but the present disclosure is not limited thereto) corresponding to the regulator 120. In some embodiments, the voltage threshold value VTH1 (e.g., 2.5 volts) is an Under Voltage Lockout voltage of the regulator 120. At this time, the output signal VOUT1 of the regulator 120 starts discharging. In other words, when the voltage value of the input signal VIN is equal to or less than the voltage threshold value VTH1 at the power-off stage P_OFF, the regulator 120 is controlled such that the voltage value of the output signal VOUT1 decreases.

As shown in the timing sequence diagram of FIG. 2, in the present disclosure, the voltage rising timing point T1 of the lower output signal VOUT1 is earlier than the voltage rising timing point T2 of the higher output signal VOUT2 at the power-on stage P_ON, and the voltage falling timing point T3 of the higher output signal VOUT2 is earlier than the voltage falling timing point T4 of the lower output signal VOUT1 at the power-off stage P_OFF.

In some related arts, resistors and capacitors are used to control the timing sequence of supplying power. However, the resistors and the capacitors are sensitive to the changes of environment (e.g., the changes of temperature). Accordingly, the timing sequence control of power supply can be incorrect due to the changes of environment.

Compared to the related arts above, the power supply circuit 100 of the present disclosure uses the regulator 120 and the regulator 140 to control the timing sequence of supplying power. The regulators are not sensitive to the change of environment. Accordingly, this can prevent the controlled timing sequence of supplying power from changing due to the changes of environment. In addition, since the voltage threshold value VTH2 is greater than the voltage threshold value VTH1, it can effectively control that the voltage falling timing point T3 of the relatively higher output signal VOUT2 is earlier than the voltage falling timing point T4 of the relatively lower output signal VOUT1 at the power-off stage P_OFF.

Figure 5:
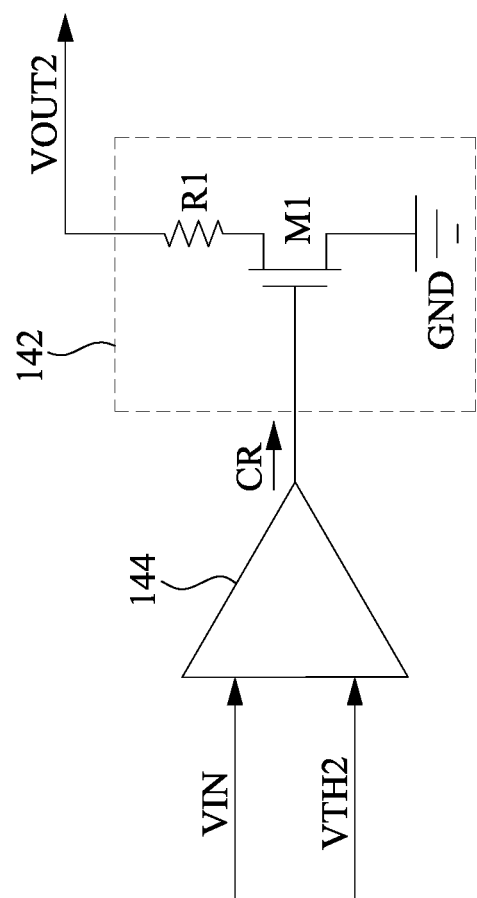
FIG. 5 is a circuit diagram of a comparator circuit in a regulator and a discharging circuit in the regulator according to some embodiments of the present disclosure.

References are made to FIG. 1 and FIG. 5. FIG. 5 is a circuit diagram of the discharging circuit 142 in the regulator 140 and a comparator circuit 144 in the regulator 140 according to some embodiments of the present disclosure.

As illustrated in FIG. 5, the discharging circuit 142 includes a transistor M1 and a resistor R1. The transistor M1 includes a first terminal, a second terminal, and a control terminal. The first terminal of the transistor M1 is coupled to the ground terminal GND. The second terminal of the transistor M1 is coupled to a first terminal of the resistor R1. A second terminal of the resistor R1 is coupled to the output terminal P4 of the regulator 140 (the output terminal P4 of the regulator 140 is configured to output the output signal VOUT2).

The comparator circuit 144 includes a first input terminal, a second input terminal, and an output terminal. The first input terminal of the comparator circuit 144 is configured to receive the input signal VIN. The second input terminal of the comparator circuit 144 is configured to receive the voltage threshold value VTH2. The comparator circuit 144 is configured to compare the voltage value of the input signal VIN with the voltage threshold value VTH2 to generate a comparison result signal CR at the output terminal of the comparator circuit 144. The control terminal of the transistor M1 is configured to receive the comparison result signal CR, and the transistor M1 is turned on or turned off according to the comparison result signal CR. When the voltage value of the input signal VIN is equal to or less than the voltage threshold value VTH2, the transistor M1 is turned on according to the comparison result signal CR, and the voltage value of the output signal VOUT2 is pulled down rapidly through the transistor M1, as the voltage falling portion of the output signal VOUT2 in the time interval D1 shown in FIG. 2.

Based on the descriptions above, the present disclosure uses regulators to control the timing sequence of supplying power. This method can prevent the timing sequence of power supply from changing due to the changes of environment. In addition, the present disclosure can effectively control that the voltage rising timing point of the relatively low output signal is earlier than the voltage rising timing point of the relatively high output signal, and effectively control that the voltage falling timing point of the relatively high output signal is earlier than the voltage falling timing point of the relatively low output signal. This voltage supply mode can be applied to advanced processes.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuity in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power supply circuit, comprising:
a first regulator configured to generate a first output signal according to an input signal, wherein a voltage value of the first output signal decreases according to the input signal and a first voltage threshold value at a power-off stage; and
a second regulator configured to be enabled according to the first output signal to generate a second output signal according to the input signal, wherein a voltage value of the second output signal decreases according to the input signal and a second voltage threshold value at the power-off stage,
wherein the second voltage threshold value is greater than the first voltage threshold value,
wherein the second regulator is controlled such that the voltage value of the second output signal decreases if a voltage value of the input signal is equal to or less than the second voltage threshold value at the power-off stage.

2. The power supply circuit of claim 1, wherein a maximum voltage value of the first output signal is less than a maximum voltage value of the second output signal.

3. The power supply circuit of claim 1, wherein the second voltage threshold value is an under voltage lockout voltage of the second regulator.

4. The power supply circuit of claim 1, wherein the first regulator is controlled such that the voltage value of the first output signal decreases if the voltage value of the input signal is equal to or less than the first voltage threshold value at the power-off stage.

5. The power supply circuit of claim 4, wherein the first voltage threshold value is an under voltage lockout voltage of the first regulator.

6. The power supply circuit of claim 1, wherein the second regulator comprises:
a discharging circuit, wherein the discharge circuit is turned on in a first time interval of the power-off stage such that the voltage value of the second output signal decreases.

7. The power supply circuit of claim 6, wherein the discharging circuit comprises:
a transistor, wherein a first terminal of the transistor is coupled to a ground terminal, and a second terminal of the transistor is configured to output the second output signal.

8. The power supply circuit of claim 7, wherein the second regulator further comprises:
a comparator configured to compare the voltage value of the input signal with the second voltage threshold value to generate a comparison result signal, wherein a control terminal of the transistor is configured to receive the comparison result signal, and the transistor is turned on or turned off according to the comparison result signal.

9. The power supply circuit of claim 6, wherein a discharging rate of the second output signal in the first time interval of the power-off stage is higher than a discharging rate of the second output signal in a second time interval of the power-off stage.

10. The power supply circuit of claim 9, wherein the second time interval is later than the first time interval.

11. The power supply circuit of claim 1, wherein the voltage value of the first output signal increases if the voltage value of the input signal is equal to or greater than the first voltage threshold value at a power-on stage.

12. The power supply circuit of claim 11, wherein the second regulator comprises:
an enable terminal configured to receive the first output signal.

13. The power supply circuit of claim 12, wherein the second regulator is enabled such that the voltage value of the second output signal increases if the voltage value of the first output signal is equal to or greater than a third voltage threshold value at the power-on stage.

14. The power supply circuit of claim 13, wherein the third voltage threshold value is less than the first voltage threshold value.

* * * * *